United States Patent [19]

Prager

[11] Patent Number: 5,128,884
[45] Date of Patent: Jul. 7, 1992

[54] BLACK BODY CALIBRATION USING IMAGE PROCESSING TECHNIQUES

[76] Inventor: Kenneth E. Prager, 9037 Gibson St., Los Angeles, Calif. 90034

[21] Appl. No.: 711,575

[22] Filed: May 31, 1991

Related U.S. Application Data

[63] Continuation of Ser. No. 452,135, Dec. 18, 1989, abandoned.

[51] Int. Cl.$^5$ .................. H01L 31/00; G06F 15/62; G01N 21/00
[52] U.S. Cl. .................. 364/571.03; 364/557; 374/2; 250/252.1
[58] Field of Search .............. 364/571, 554, 557, 575, 364/580, 734, 806, 811, 812, 550; 250/252.1 A, 339, 347; 374/2, 10; 73/1 R; 356/51

[56] References Cited

U.S. PATENT DOCUMENTS

| | | | |
|---|---|---|---|
| 3,694,654 | 9/1972 | Crownover | 250/339 |
| 3,812,359 | 5/1974 | Meier et al. | 250/347 |
| 4,387,301 | 6/1983 | Wirick et al. | 374/2 |
| 4,654,710 | 3/1987 | Richard | 364/734 |
| 4,864,842 | 9/1989 | Regimand | 364/571.02 |
| 4,876,453 | 10/1989 | Wirick | 250/252.1 A |

OTHER PUBLICATIONS

Schell, "Temperature Calibration of an Infrared Radiation Source", Applied Optics, 1 Nov. 1980, pp. 3622–3625.

Humphreys, R. A.; an image scanner for testing night vision systems; Electro-Optics/Laser International '76 UK; Mar. 1976; pp. 183–187.

*Primary Examiner*—Parshotam S. Lall
*Assistant Examiner*—Michael Zanelli
*Attorney, Agent, or Firm*—W. J. Streeter; W. K. Denson-Low

[57] ABSTRACT

Techniques for calibrating differential temperature sources including the use of a calibrated infrared imaging sensor having an associated calibrated temperature function that is expressed as a function of a predetermined calculated parameter indicative of the actual differential temperature of a differential temperature source. The temperature source being calibrated is thermally imaged at different indicated differential temperatures to provide thermal images associated with the indicated temperatures, and such images are processed to define the calculated parameter as as function of indicated temperature. The calculated parameter function is substituted in the calibrated temperature function to provide a calibrated temperature function that is expressed as a function of indicated differential temperature.

8 Claims, 4 Drawing Sheets

FULL CALIBRATION OF SENSOR

FULL CALIBRATION OF DIFF. TEMP. SOURCE

CALIBRATION CURVE

BLACK BODY CALIBRATION USING IMAGE PROCESSING TECHNIQUES

This is a continuation of application Ser. No. 452,135, filed Dec. 18, 1989 now abandoned.

BACKGROUND OF THE INVENTION

The present invention generally relates to apparatus for testing infrared (IR) sensors, and is directed more particularly to apparatus for calibrating black body differential temperature sources that are utilized in testing IR sensors.

Infrared sensors are utilized to produce data based on the thermal signature of the scene being viewed, and are commonly tested relative to differential temperature sources (also referred to as black body sources) such as those commercially available from Electro Optical Industries, Inc., Santa Barbara, Calif.

Differential temperature sources typically include a target plate having an apertured pattern and a controlled plate, with the target plate being closer to the IR imaging system being tested. The temperature difference between the target plate and the controlled plate is controlled pursuant to an input differential temperature setting (i.e., the desired temperature difference between the plates) by a temperature controller, for example by monitoring both plates and leaving the target plate at ambient temperature while controlling the temperature of the controlled plate.

Typically, the temperature controller of a differential temperature source provides an indicated differential temperature information in the form of a human viewable display as well as a data output, for example on a bus conforming to the IEEE 488 standard. However, the relation between the indicated differential temperature and the actual differential temperature may not always be known, and for testing purposes the differential temperature source must be calibrated so that actual differential temperatures can be calculated from indicated differential temperatures.

A known technique for differential temperature source calibration involves utilizing a digital temperature thermometer (DTT) to obtain the actual differential temperatures over a range of indicated differential temperatures. The differences between indicated differential temperature values and the corresponding actual differential temperatures (sometimes referred to as offsets) are utilized as correction factors that can be applied to the readout values. Additionally, collimator efficiency and target emissivity correction factors are calculated separately.

An important consideration with the foregoing technique is that typically the calibration needs to be performed at a location different from the IR sensor testing station which can be disruptive, cause delays, and may require readjustment of the test station optical alignment. Moreover, it requires manual data taking, as well as separate calculations of different correction factors.

SUMMARY OF THE INVENTION

It would therefore be an advantage to provide apparatus for calibrating differential temperature sources which can be utilized at an IR sensor test station.

Another advantage would be to provide apparatus for calibrating differential temperature sources which calculates calibration information that takes into account collimator efficiency and target emissivity without separate calculations.

The foregoing and other advantages are provided by the invention in a process for calibrating differential temperature sources which includes the step of providing a calibrated infrared imaging sensor having an associated calibrated temperature function that is expressed as a function of a predetermined calculated parameter which is indicative of the actual differential temperature of a differential temperature source. The temperature source being calibrated is thermally imaged at indicated differential temperatures to provide thermal images associated with the indicated temperatures. From the thermal images, the predetermined calculated parameter indicative of the actual differential temperature of the imaged temperature source is calculated for the different indicated temperatures, and a calculated parameter function is determined as a function of indicated temperature. The calculated parameter function is then substituted in the calibrated temperature function to provide a calibrated temperature function that is expressed as a function of indicated differential temperature.

The invention also contemplates calibration apparatus that includes a calibrated infrared imaging sensor having an associated calibrated temperature function that is expressed as a function of a predetermined calculated parameter indicative of the actual differential temperature of a differential temperature source. The sensor provides video outputs for different indicated differential temperatures provided by the differential temperature source under calibration to a processor which determines a calculated parameter function that defines the predetermined calculated parameter as a function of indicated differential temperature. The processor further substitutes the calculated parameter function in the calibrated temperature function to provide a calibrated temperature function that is a function of indicated differential temperature.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

Figure 1:
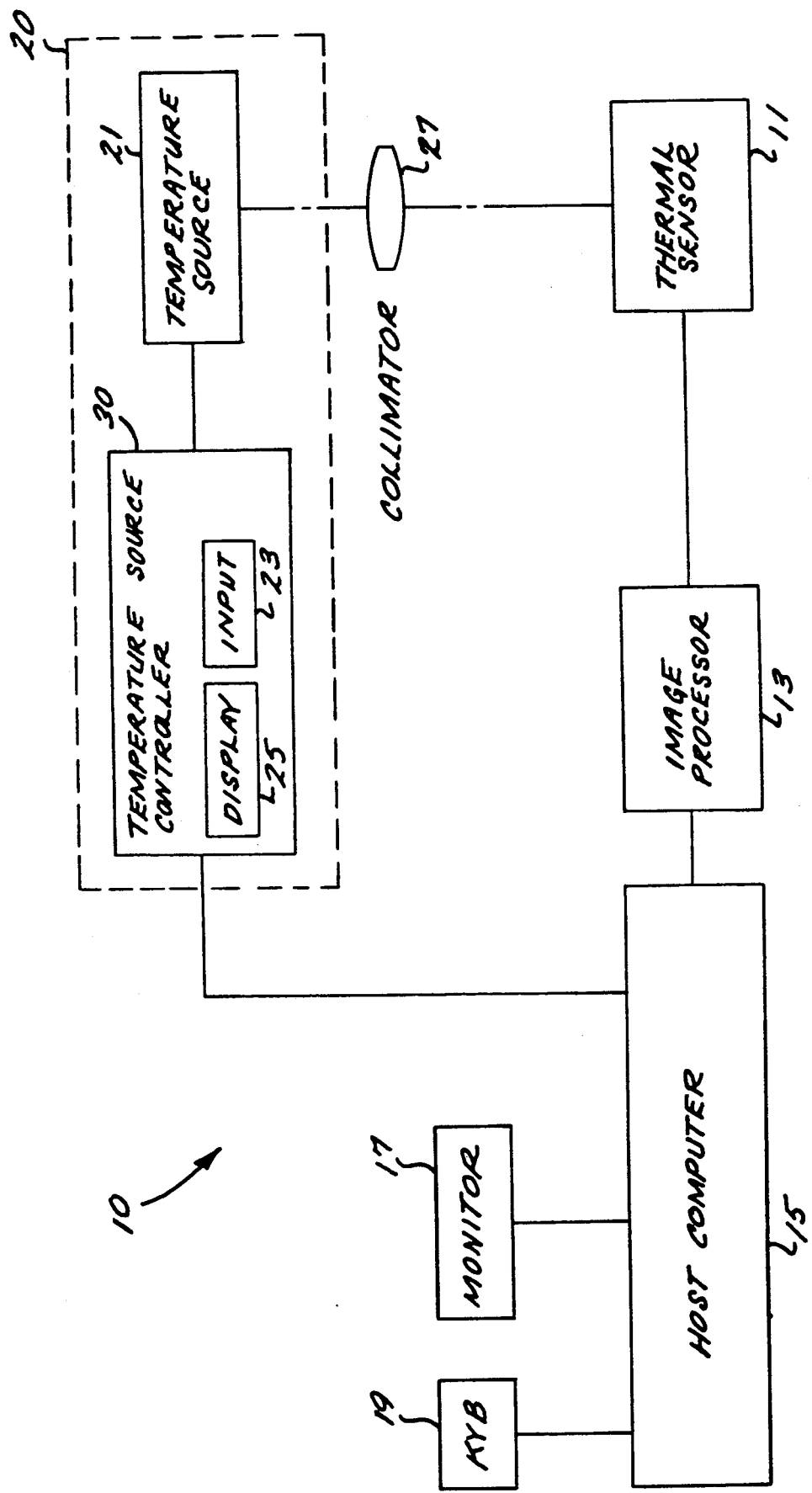
FIG. 1 is a block diagram of an illustrative example of a differential temperature source calibration system in accordance with the invention.

In the following detailed description and in the several figures of the drawing, like elements are identified with like reference numerals.

Referring now to FIG. 1, shown therein are the components of a calibration system 10 for calibrating a differential temperature source 20. The calibration system 10 includes a thermal imaging sensor 11 that provides video outputs to an image processor 13. By way of specific example, the imaging sensor 11 provides standard analog video to the image processor 13 which converts the video outputs into digital video which it stores. The image processor 13 is controlled, for example, by a host computer 15 that is coupled to a video monitor 17 which can be utilized to display the output of the image processor 13 and display communications from the host computer 15. A keyboard 19 provides inputs to the host computer 15.

The differential temperature source 20 includes a differential temperature target 21 and a controller 30 for controlling the differential temperature exhibited by the differential temperature target 21. The controller 30 includes a temperature input 23, switches for example, by which the desired differential temperatures is input to the controller 30. The controller 30 further includes a display 25 for displaying indicated differential temperature (i.e., what the controller detects as the differential temperature). Temperature inputs and indicated differential temperature data can also be communicated between the host computer 15 and the differential temperature source via an appropriate bus or communications channel.

A collimator 27 provides collimated infrared radiation to the thermal imaging sensor 11, as is common on infrared sensor test stations.

The generation and storage of digital video data is well known in the art and will not be discussed with any particularity. However, for purposes of this invention, it may be helpful to discuss some general concepts as to the organization of digital video. Typically, digital video data comprises intensity or gray level values (e.g., having a range of 0 to 255) associated with respective pixels in respective frames, where for example each frame corresponds to one complete scan by the imaging sensor 11. Since the video data is in digital form, it can be processed and utilized pursuant to digital techniques, as employed by the invention.

The technique of the invention essentially determines the relation between indicated differential temperature $\Delta T_i$ and actual or calibrated differential temperature $\Delta T_c$. Briefly, that relationship is determined by calibrating the thermal imaging sensor 11 relative to actual differential temperatures, for example by using a digital temperature thermometer (DTT), to define differential temperature as a function of a calculated video data parameter A which is based on measured parameters:

$$\Delta T_c = f(A)$$

Once the differential temperature function f(A) is defined for the thermal imaging sensor 11, it can be used to calibrate differential temperature sources without using a DTT by utilizing the calibrated thermal imaging sensor 11 to define the calculated parameter A as a function of indicated differential temperature $\Delta T_i$ for a differential temperature source under calibration:

$$A = g(\Delta T_i)$$

The calculated parameter function $g(\Delta T_i)$ is then substituted in the differential temperature function f(A) to provide a differential temperature function that is a function of indicated differential temperature $\Delta T_i$:

$$\Delta T_c = f(g(\Delta T_i))$$

By way of illustrative example, the calculated parameter A for a given differential temperature source can be the sum $\Sigma$ of maxima and minima of the video data for a standard target (e.g., a four bar target) divided by the standard deviation N of the random noise in the video data:

$$A = \Sigma/N$$

It has been determined that the function $\Sigma/N$ is directly proportional to the actual differential temperature of the differential temperature target. The sum $\Sigma$ is readily calculated pursuant to known maxima and minima detection techniques from an averaged data frame which is the average of a plurality of image frames, for example 256 frames. The standard deviation N of the random noise is also calculated by known techniques, for example by subtracting the averaged data frame from an image frame that was not utilized in defining the averaged frame. The resulting difference frame represents random noise, and the standard deviation of the random noise frame is calculated pursuant to standard techniques.

Figure 2:
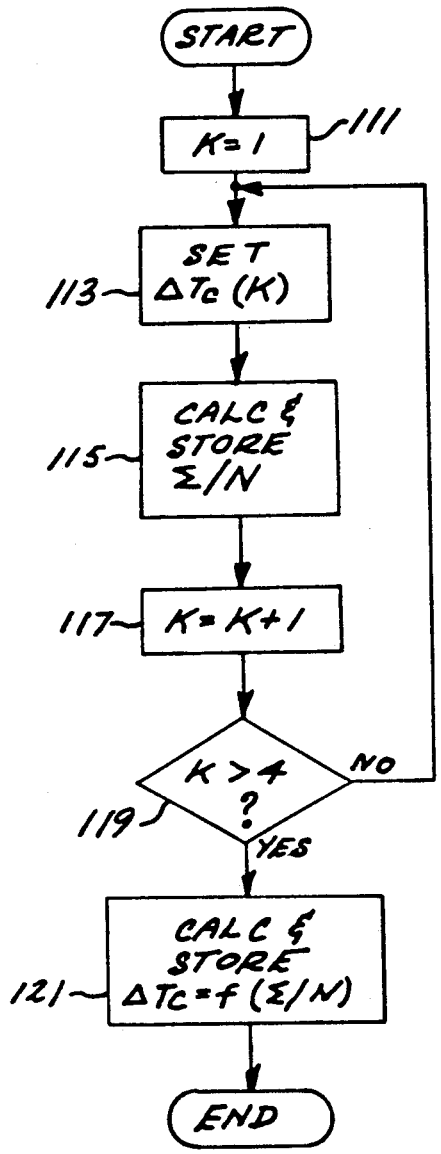
FIG. 2 is a flow diagram of an illustrative example of a process that can be utilized to calibrate the IR imaging sensor of the calibration system of FIG. 1.

Referring now to FIG. 2, shown therein is an illustrative example of a process for defining the calibrated differential temperature function f(A). At 111 an iteration count value K is initialized to 1.

An actual differential temperature $\Delta T_c(K)$ is set at 113, such actual differential temperature being selected so as to provide for an appropriate range of positive and negative actual differential temperatures $\Delta T_c(1)$ through $\Delta T_c(L)$, where L is the number of samples to be taken. At 115 the calculated parameter $A = \Sigma/N$ for the selected actual differential temperature is calculated and stored in memory with the associated actual differential temperature $\Delta T_c(K)$. The count value K is incremented by 1 at 117, and a determination is made at 119 as to whether the count value K is greater than the predetermined limit L. If yes, indicating that L values of the calculated parameter A have been measured, processing continues at 121. If no, processing continues with 113.

At 121 the calibrated temperature function f(A) is determined from the stored data, for example by known numerical techniques, and is stored.

Figure 4:
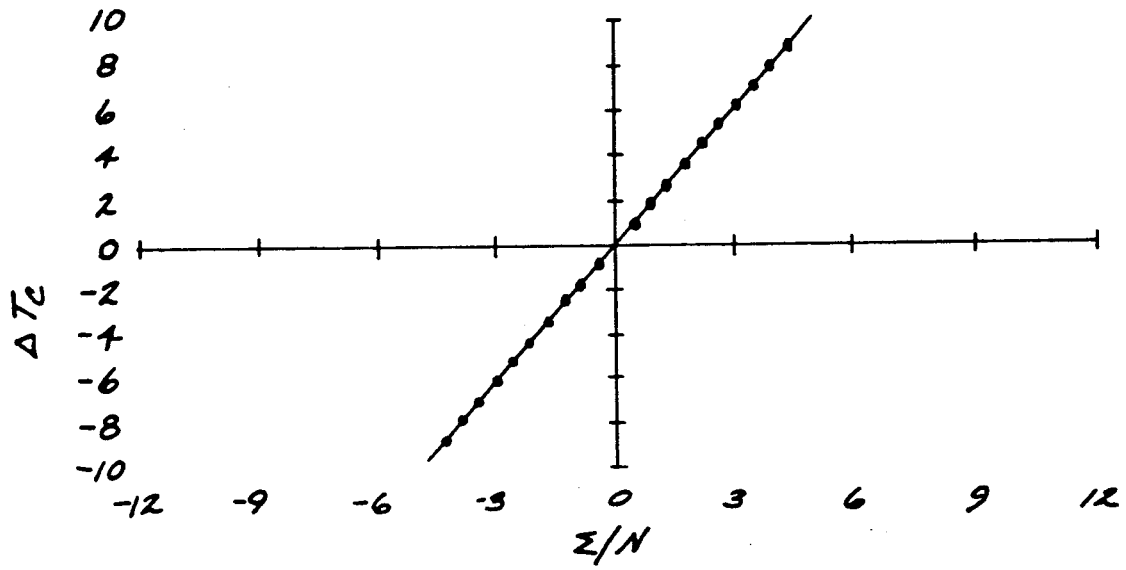
FIG. 4 is a graph schematically depicting calibration data for the IR imaging sensor of the calibration system of FIG. 1.

FIG. 4 is a graph that schematically illustrates the $\Delta T_c$ vs. $\Sigma/N$ calibration data for a thermal imaging sensor that is generally linear (i.e., the actual differential temperature $\Delta T_c$ and the calculated parameter $\Sigma/N$ have a linear relation).

Figure 3:
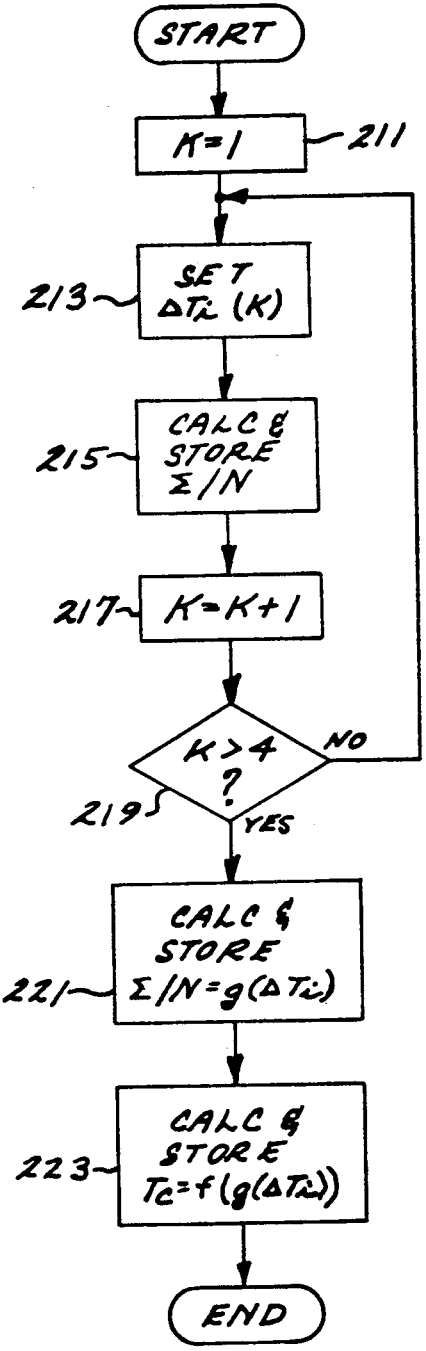
FIG. 3 is a flow diagram of an illustrative example of process that can be utilized by the calibration system of FIG. 1 to calibrate a differential temperature source.

Referring now to FIG. 3, shown therein is an illustrative example of a process for deriving the calculated parameter function $g(\Delta T_i)$. At 211 an iteration count value K is initialized to 1.

An indicated (i.e., displayed) differential temperature $\Delta T_i(K)$ is set at 213, such indicated differential temperature being selected so as to provide for an appropriate range of positive and negative indicated differential temperatures $\Delta T_i(1)$ through $\Delta T_i(M)$, where M is the number of samples to be taken. At 215 the calculated parameter A is calculated and stored in memory together with the associated indicated differential temperature $\Delta T_i(K)$. The count value K is incremented by 1 at 217, and a determination is made at 219 as to whether the count value K is greater than a predetermined limit M. If yes, indicating that M values of the calculated parameter A have been measured, processing continues at 221. If no, processing continues at 213.

A 221 the measured parameter function $g(\Delta T_i)$ is determined from the stored data, for example by known numerical techniques.

At 223 the calculated parameter function $g(\Delta T_i)$ is substituted in the calibrated differential temperature function f(A) for the calibrated thermal imaging sensor 11 to provide for the differential temperature source a calibrated temperature function that is a function of indicated differential temperature.

Figure 5:
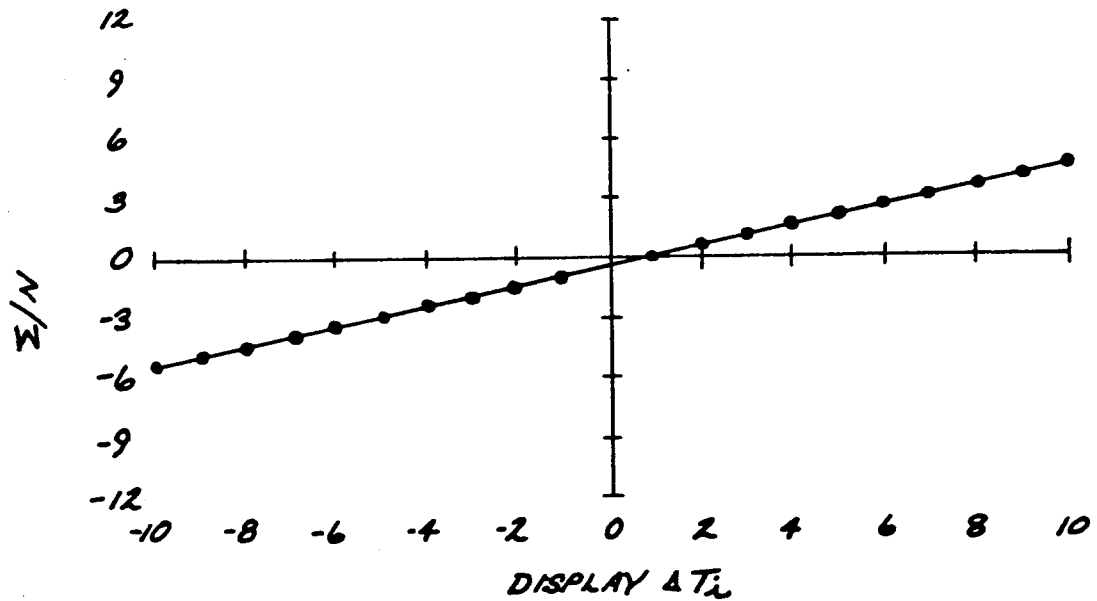
FIG. 5 is a graph schematically depicting calibration data for a differential temperature source being calibrated with the calibration system of FIG. 1.
Figure 6:
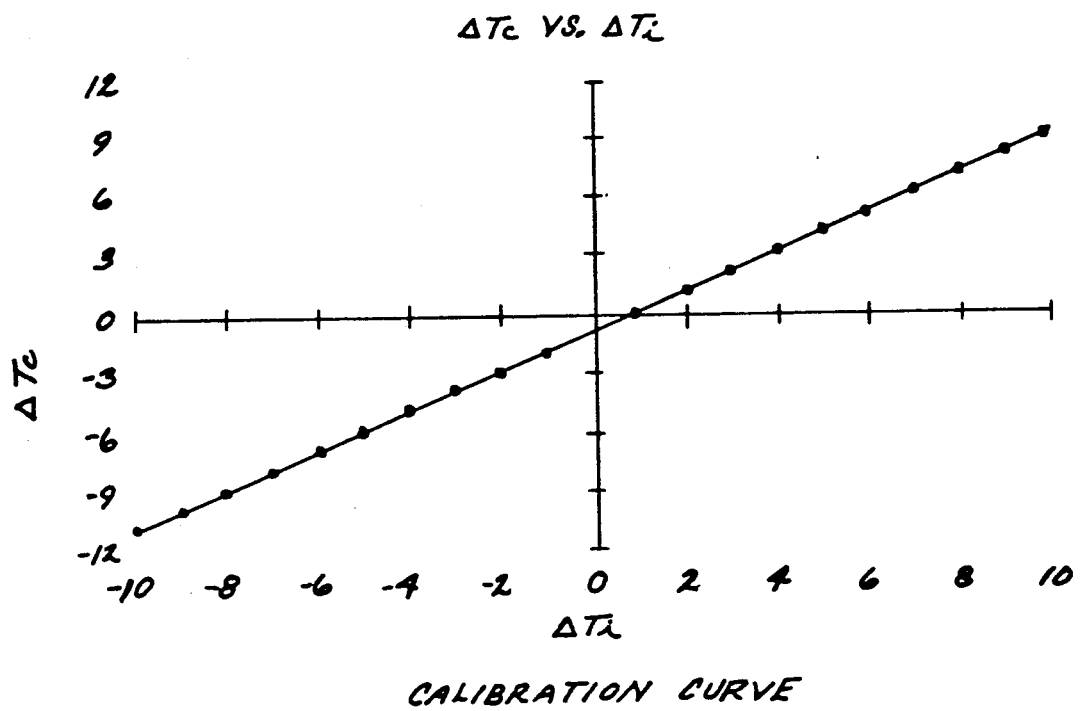
FIG. 6 is a graph schematically depicting calculated calibration data for a differential temperature source that has been calibrated with the calibration system of FIG. 1.

FIG. 5 is a graph that schematically illustrates the $\Sigma/N$ vs. $\Delta T_i$ calibration data for a differential temperature source that is being calibrated with a thermal imaging sensor that was calibrated pursuant to the process of FIG. 2 and which exhibited calibration data as depicted in FIG. 4. FIG. 6 is a graph that schematically illustrates $\Delta T_c$ vs. $\Delta T_i$ calibration data for a differential temperature source calibrated pursuant to the processes of FIGS. 2 and 3 and which utilized calibration data as in FIGS. 4 and 5.

It should be appreciated that the thermal sensor calibration process of FIG. 2 can alternatively be performed with a calibrated differential temperature source at a thermal sensor test station and without a DTT. In particular, the calibrated differential temperature of the differential temperature source (as determined by the host computer from indicated temperature, for example) would be utilized at 113 as $\Delta T_a$.

Figure 7:
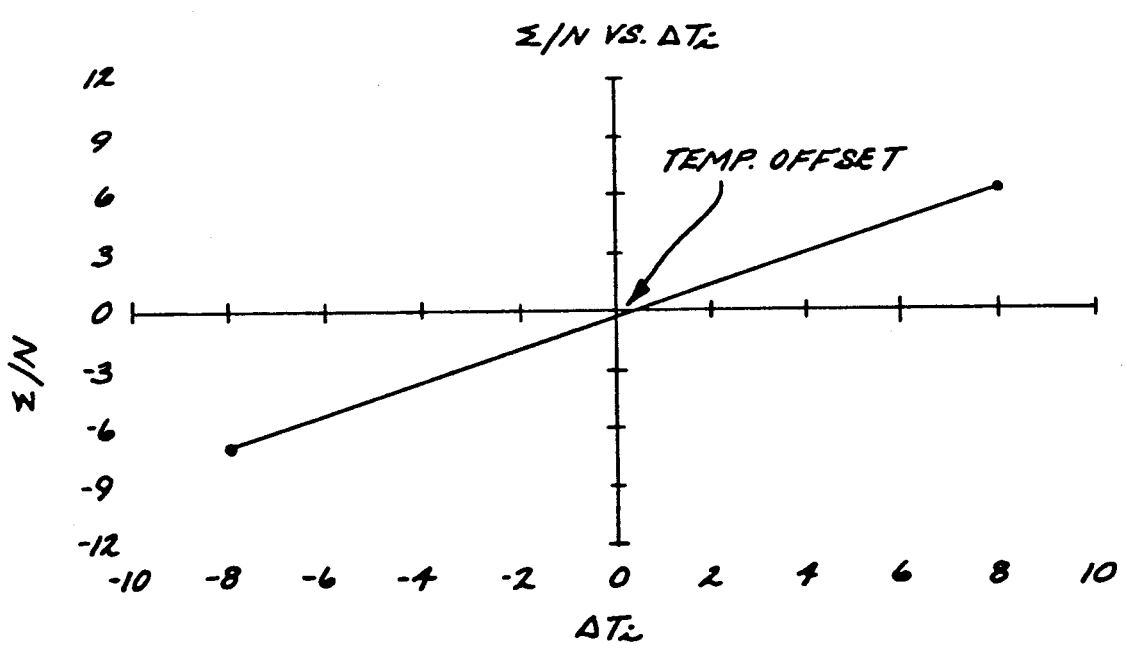
FIG. 7 is a graph schematically depicting a process for determining the temperature offset for a differential temperature source known to have a constant offset.

While the process of FIG. 3 involves generating calibration data for more than 2 data points, it should be realized that for a differential temperature source known to have a substantially constant offset (i.e., the difference between indicated temperature and actual temperature is within a given tolerance for all indicated temperatures), an abbreviated calibration can be utilized, assuming a substantially linear thermal imaging sensor calibration. Specifically, the calculated parameter $\Sigma/N$ can be measured for a positive indicated differential temperature and a negative indicated differential temperature. The line defined by the two data points is calculated pursuant to standard algebraic techniques, and a constant offset is defined by the indicated temperature when the calculated parameter $\Sigma/N$ is set to 0. This process is schematically depicted in the graph of FIG. 7 wherein the offset is defined by the intersection of the line with the indicated differential temperature axis.

The foregoing has been a disclosure of a differential temperature source calibration technique and system which advantageously provides for calibration at an IR imaging sensor test station and without the use of a digital temperature thermometer. The calibration technique and system further provides for temperature source calibration without disrupting IR imaging sensor test procedures and test alignments. Also, the calibration technique and system implicitly accounts for collimator efficiency and target emissivity without the need for separate calculations.

Although the foregoing has been a description and illustration of specific embodiments of the invention, various modifications and changes thereto can be made by persons skilled in the art without departing from the scope and spirit of the invention as defined by the following claims.

What is claimed is:

1. A method for calibrating a differential temperature source having actual differential temperatures and corresponding indicated differential temperatures, comprising the steps of:
   (a) providing a calibrated infrared imaging sensor having an associated calibrated temperature function that is expressed as a function of a predetermined calculated parameter that is indicative of the actual differential temperature of a differential temperature source;
   (b) thermally imaging the temperature source at an indicated differential temperature to provide thermal images associated with the indicated temperature;
   (c) processing the thermal images to generate an average thermal image frame for the indicated differential temperature;
   (d) summing certain predetermined image data points of the average thermal image frame to provide a data point sum for the indicated differential temperature;
   (e) calculating the standard deviation N of the random noise contained in the thermal images for the indicated differential temperature;
   (f) dividing the data point sum by the standard deviation N of the random noise contained in the thermal images to produce a calculated parameter for the indicated differential temperature;
   (g) repeating steps (b) through (f) for a number of iterations at different indicated differential temperatures;
   (h) determining from the calculated parameters for all of the indicated differential temperatures a calculated parameter function which is a function of indicated temperature; and
   (i) substituting the calculated parameter function in the calibrated temperature function to provide a calibrated temperature function that provides actual differential temperature as a function of indicated differential temperature.

2. The method of claim 1 wherein the step of summing certain predetermined image data points includes the step of summing the maxima and minima of the average image data for the indicated differential temperature.

3. The method of claim 2 wherein the step of calculating the standard deviation N of the random noise includes the steps of:
   (1) averaging a plurality of image data frames to produce an average image data frame;
   (2) subtracting the average image data frame from an image data frame to produce a random noise frame; and
   (3) calculating the standard deviation of the random noise frame.

4. A system for calibrating a differential temperature radiation source comprising:
   a test differential temperature radiation source having a target plate and controlled plate;
   a standard differential temperature radiation source having a target plate and a controlled plate;

a temperature controller for controlling the temperature differential between said target plate and said controlled plate in one of said test and standard differential temperature radiation sources;

a thermal imaging sensor for receiving said radiation from either of said differential temperature radiation sources and for producing an analog signal in response thereto, said thermal imaging sensor being disposed to receive radiation from either said standard differential temperature radiation source or from said test differential temperature radiation source;

an image processor for converting said analog signal from said thermal imaging sensor to a digital signal;

a host computer coupled to said image processor and to said temperature controller for providing a corrected measurement of said indicated temperature, said host computer including;

means for calibrating said thermal imaging sensor by defining a differential temperature function A for said thermal imaging sensor based on a standard differential temperature radiation source, and based on measured differential temperatures;

means for calibrating said test differential temperature radiation source by using said calibrated thermal image sensor to calculate function A as a function of said indicated temperature difference for said test differential temperature source; and means for substituting the calculated function A in the calibrated temperature function to provide a calibration temperature function that provides actual differential temperatures as a function of indicated differential temperature, whereby said test differential temperature radiation source can be calibrated without removal from said system.

5. The system of claim 4 wherein said means for calibrating said thermal imaging sensor further includes means for determining said differential temperature function A as the sum of maximum and minimum of analog signals from said thermal sensor for a standard target divided by the standard deviation of the random noise in said analog signals from said thermal sensor.

6. The system of claim 5 wherein aid means for calibrating said test differential temperature radiation source further comprises:
   means for averaging a plurality of image data frames to produce an average image data frame;
   means for subtracting the average image data frame from an image data frame to produce a random noise frame; and
   means for calculating the standard deviation of the random noise frame.

7. The system of claim 4 wherein said test and standard differential temperature radiation sources are infrared radiation sources.

8. An infrared night vision test system comprising:
   a test differential temperature radiation source having a target plate and controlled plate;
   a standard differential temperature radiation source having a target plate and a controlled plate;
   a temperature controller for controlling the temperature differential between said target plate and said controlled plate in one of said radiation sources;
   temperature indicator for displaying an indicated temperature differential in one of said radiation sources;
   a thermal imaging sensor for receiving said radiation from either of said differential temperature radiation sources and for producing an analog signal in response thereto, said thermal imaging sensor being disposed to receive radiation from either said standard differential temperature radiation source or from said test differential temperature radiation source;
   an image processor for converting said analog signal from said thermal imaging sensor to a digital signal;
   a host computer coupled to said image processor and to said temperature controller for providing a corrected measurement of said indicated temperature, said host computer including;
   means for calibrating said thermal imaging sensor by defining a differential temperature function A for said thermal imaging sensor based on a standard differential temperature radiation source, and based on measured differential temperatures;
   means for calibrating said test differential temperature radiation source by using said calibrated thermal image sensor to calculate function A as a function of said indicated temperature difference for said test differential temperature source;
   means for substituting the calculated function A in the calibrated temperature function to provide a calibration temperature function that provides actual differential temperatures as a function of indicated differential temperature, whereby said test differential temperature radiation source can be calibrated without removal from said system;
   means for thermally imaging the temperature source at an indicated differential temperature to provide thermal images associated with the indicated temperature;
   means for processing the thermal images to generate an average thermal image frame for the indicated differential temperature; and
   means for summing certain predetermined image data points of the average thermal image frame to provide a data point sum for the indicated differential temperature.

* * * * *